(12) United States Patent
Dalcher (10) Patent No.: US 7,987,451 B1
(45) Date of Patent: Jul. 26, 2011

(54) SYSTEM, METHOD AND COMPUTER PROGRAM PRODUCT FOR VERIFYING INVOCATIONS OF INTERFACES

(75) Inventor: Gregory William Dalcher, Tigard, OR (US)

(73) Assignee: McAfee, Inc., Santa Clara, CA (US)

( * ) Notice: Subject to any disclaimer, the term of this patent is extended or adjusted under 35 U.S.C. 154(b) by 1221 days.

(21) Appl. No.: 11/561,809

(22) Filed: Nov. 20, 2006

(51) Int. Cl.
*G06F 9/44* (2006.01)
*G06F 11/00* (2006.01)

(52) U.S. Cl. .......... 717/126; 717/127; 717/141; 726/22; 726/23; 726/26; 726/27

(58) Field of Classification Search .................. 717/126
See application file for complete search history.

(56) References Cited

U.S. PATENT DOCUMENTS

| | | | | |
|---|---|---|---|---|
| 5,313,616 | A * | 5/1994 | Cline et al. ................... | 717/127 |
| 5,963,739 | A * | 10/1999 | Homeier ....................... | 717/126 |
| 6,412,071 | B1 * | 6/2002 | Hollander et al. ............ | 726/23 |
| 6,529,985 | B1 * | 3/2003 | Deianov et al. .............. | 710/260 |
| 6,601,114 | B1 * | 7/2003 | Bracha et al. ................ | 719/332 |
| 6,618,769 | B1 * | 9/2003 | Bracha et al. ................ | 719/332 |
| 6,959,441 | B2 * | 10/2005 | Moore .......................... | 719/328 |
| 7,120,572 | B1 * | 10/2006 | Liang ............................ | 703/26 |
| 7,287,243 | B2 * | 10/2007 | Dollin et al. ................. | 717/126 |
| 7,434,210 | B1 * | 10/2008 | Tucker .......................... | 717/138 |
| 7,530,076 | B2 * | 5/2009 | Underseth et al. ........... | 719/313 |
| 7,664,924 | B2 * | 2/2010 | Safa ............................. | 711/163 |
| 2005/0010804 | A1 | 1/2005 | Bruening et al. ............. | 713/200 |
| 2005/0108562 | A1 * | 5/2005 | Khazan et al. ................ | 713/200 |
| 2005/0257191 | A1 * | 11/2005 | Underseth et al. ........... | 717/106 |
| 2006/0075386 | A1 * | 4/2006 | Loh et al. ..................... | 717/124 |
| 2006/0092846 | A1 * | 5/2006 | Loh et al. ..................... | 370/241 |

OTHER PUBLICATIONS

Rabek et al. "Detection of Injected, Dynamically Generated, and Obfuscated Malicious Code" © 2003 Association for Computing Machinery.
Park et al. "Repairing Return Address Stack For Buffer Overflow Protection" © ACM Frontiers of Computing, Ischia, Italy Apr. 2004.
Kc. et al. "e-NeXSh: Achieving An Effectively Non-Executable Stack and Heap via System-Call Policing," In Proceedings of the Annual Computer Security Conference, 2005.
Xu et al. "Architecture Support for Defending Against Buffer Overflow Attacks," Center for Reliable and High-Performance Computing Coordinated Science Laboratory, University of Illinois, 2002.

* cited by examiner

*Primary Examiner* — Thomas K Pham
(74) *Attorney, Agent, or Firm* — Wong, Cabello, Lutsch, Rutherford & Brucculeri, LLP (57) ABSTRACT

A verification system, method and computer program product are provided. In one embodiment, one of a plurality of call instruction formats is selected. In addition, it is verified whether an invocation of an interface was attempted by code utilizing the selected call instruction format. Further, the selection and the verification are repeated for each of the plurality of call instruction formats. In another embodiment, a return target address is identified. Still yet, it is determined whether return of contra to the return target address would result in invocation a one of a plurality of interfaces.

25 Claims, 5 Drawing Sheets

SYSTEM, METHOD AND COMPUTER PROGRAM PRODUCT FOR VERIFYING INVOCATIONS OF INTERFACES

FIELD OF THE INVENTION

The present invention relates to interfaces, and more particularly to monitoring interfaces for a variety of purposes.

BACKGROUND

Interfaces, such as application program interfaces (API's), are generally monitored for various reasons. For example, interfaces may be monitored for security purposes, for understanding a flow of applications, for tracking problems associated with applications, etc. Traditionally, security-related monitoring has involved examining return addresses passed to an interface by a caller that invokes the interface, for verifying that the call to the interface is valid (e.g. non-malicious, etc.). However, various techniques are available to callers which allow them to hide the actual return addresses or otherwise obfuscate their identify, thus allowing such callers to escape detection.

There is thus a need for overcoming these and/or other issues associated with the prior art.

SUMMARY

A verification system, method and computer program product are provided. In one embodiment, one of a plurality of call instruction formats is selected. In addition, it is verified whether an invocation of an interface was attempted by code utilizing the selected call instruction format. Further, the selection and the verification are repeated for each of the plurality of call instruction formats. In another embodiment, a return target address is identified. Still yet, it is determined whether return of control to the return target address would result in invocation of one of a plurality of interfaces.

DETAILED DESCRIPTION

Figure 1:
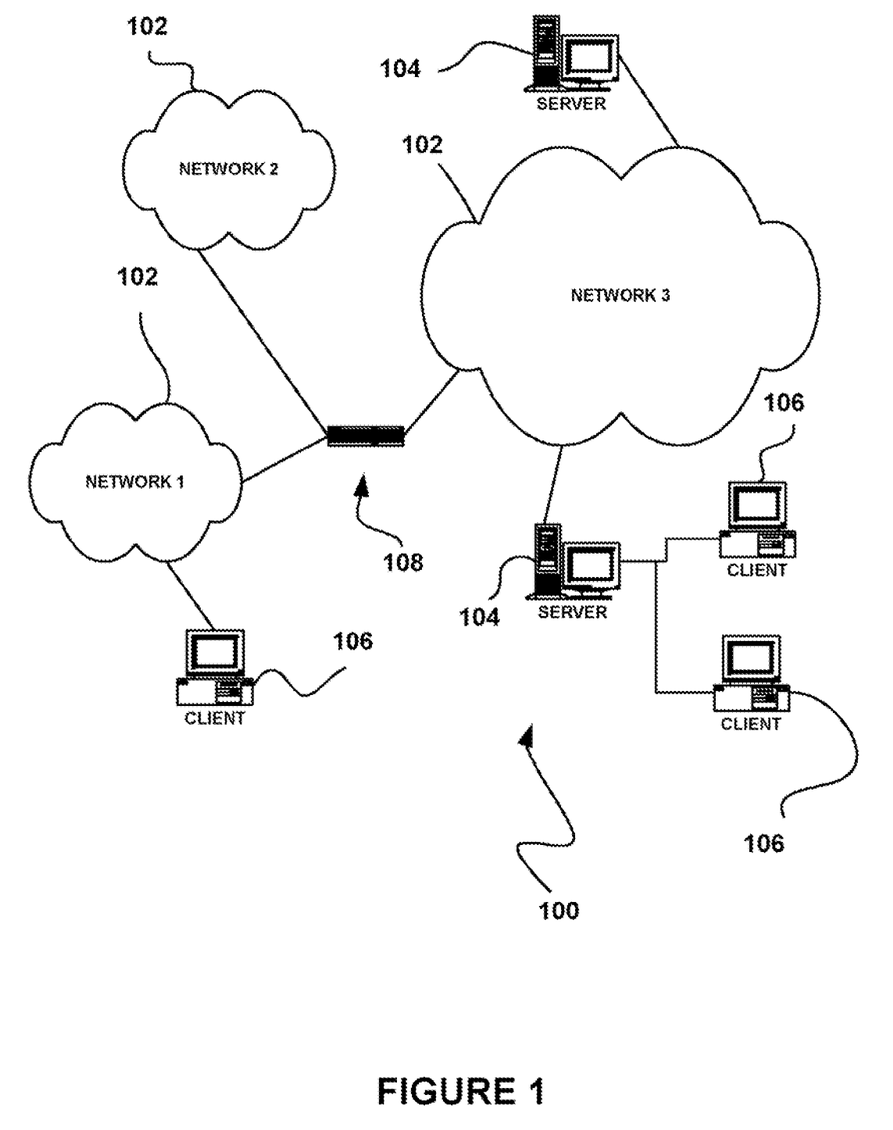
FIG. 1 illustrates a network architecture accordance with one embodiment.

FIG. 1 illustrates a network architecture 100, in accordance with one embodiment. As shown, a plurality of networks 102 is provided, in the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer/device, and/or any other type of logic, for that mater. In order to facilitate communication among the networks 102, at least one gateway 108 is optionally coupled therebetween.

Figure 2:
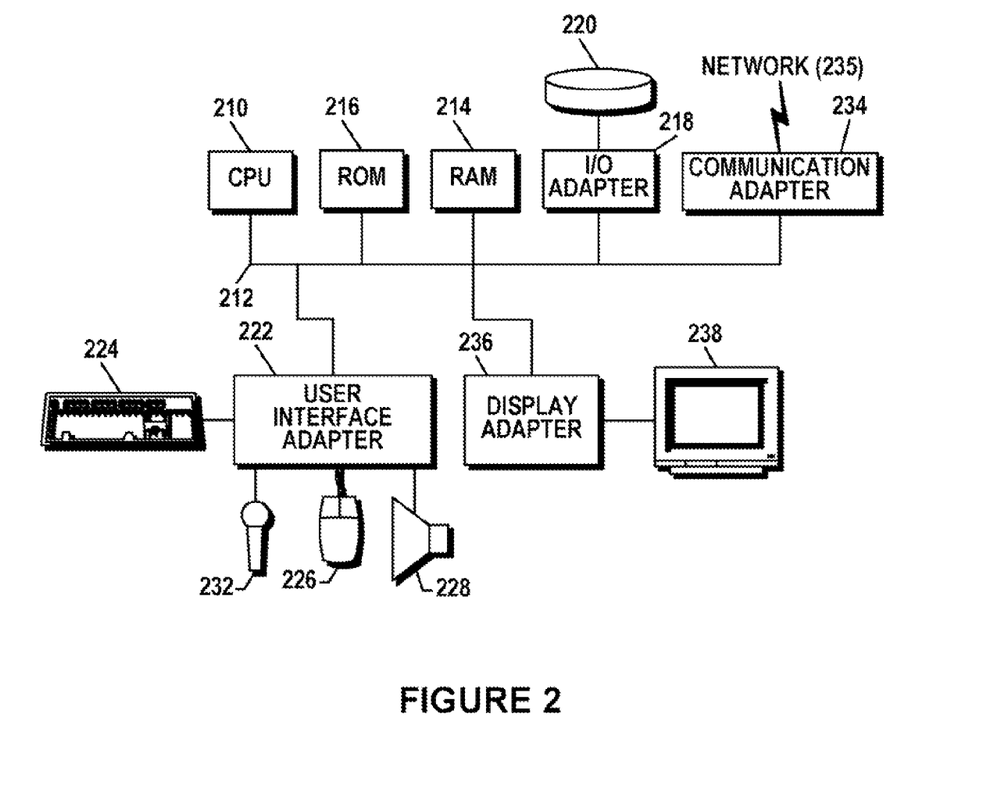
FIG. 2 shows a representative hardware environment, that may be associated with the servers aid/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit (CPU) 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA. C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3A:
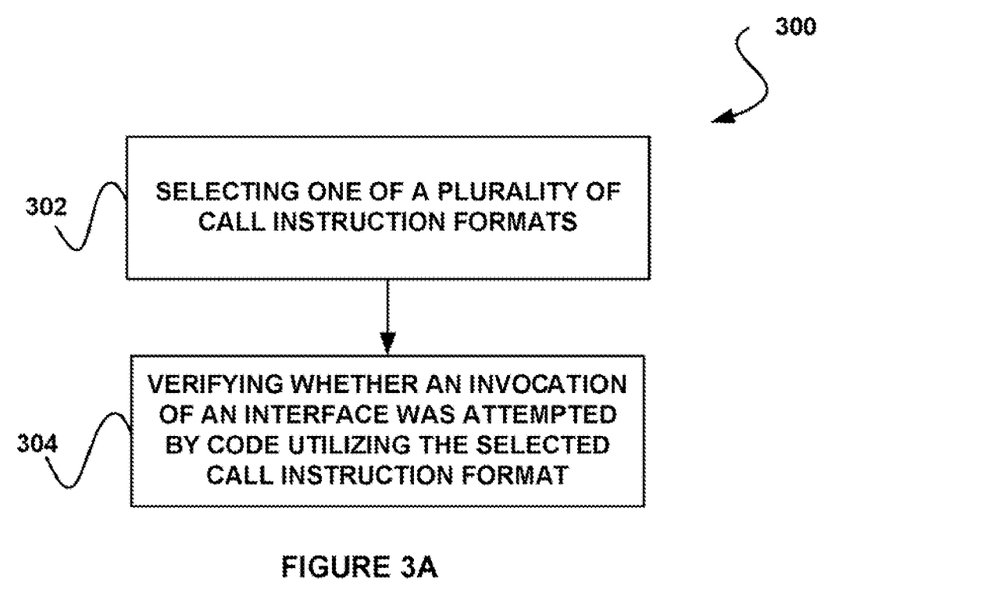
FIG. 3A shows a method for verifying an invocation of an interface, in accordance with one embodiment.

FIG. 3A shows a method 300 for verifying an invocation of an interface, in accordance with one embodiment. As an option, the method 300 may be implemented in the context of the architecture and environment of FIGS. 1 and/or 2. Of course, however, the method 300 may be carried out in any desired environment.

As shown in operation 302, one of a plurality of call instruction formats is selected. In one embodiment, the call instruction formats may each include a template. In this way, each template may define a different format of call instructions. Just by way of example, each template may define a length of a call instruction. Of course, in the context of the present description, a call instruction format may refer to any format associated with a call instruction capable of invoking or leading to the invoking of an interface.

In various embodiments, the call instruction formats may be identified by analyzing call instruction formats supported by a CPU of an associated computer that attempts to invoke an interface (in a manner that will be set forth later). Such analysis may, for example, include determining call instruction formats described in a published document provided by a manufacturer of the CPU and storing the same in a database. To this end, the analysis may first include identifying the CPU, such that the corresponding call instruction formats may be looked up in the database. In different embodiments, the aforementioned computer may include any of the servers and/or clients described above with respect to FIGS. 1 and/or 2, but of course may include any computer capable of being associated with a CPU or some other processor(s).

Still yet, one of the plurality of call instruction formats may be selected based on an ordering of the call instruction formats. Thus, in one optional embodiment, the call instruction formats may be stored in a list of call instruction formats. Accordingly, a first call instruction format in the list may be selected, after which a second one may be selected, and so forth. Of course, it should be noted that one of the call instruction formats may be selected in any desired manner.

Additionally, it is verified whether an invocation of an interface was attempted by code utilizing the selected call instruction format, as Shown in operation 304. In one embodiment, the interface may include any computer code, data structure, or protocol that facilitates communication between a first instance of hardware or software, with another instance of hardware or software. In one optional embodiment, such hardware or software may be a component of any of the servers and/or clients described above with respect to FIG. 1.

In another embodiment, the interface may include a software interface. For example, the interface may include an application programming interface (API) for facilitating communication between an application and an underlying operating system. Further, such invocation of the interface may include a call to the interface, such as code (e.g. instruction, etc.) that transfers control to the interface. In another embodiment, the call to the interface may be made by an application.

In use, the verification of operation 304 may be repeated for each of the call instruction formats. To this end, if it can not be verified that the invocation of the interface was attempted utilizing at least one of the call instruction formats, it can be concluded that there is at least a potential that the code (that attempted the invocation) may be obfuscating its identify (which is typically done for malicious purposes). Thus, an appropriate reaction may be initiated.

It should be noted that the foregoing verification may be carried out in any desired manner that utilizes the known call instructions formats. During reference to FIG. 4, more illustrative information will be set forth regarding various optional features of a different embodiment with which the foregoing method 300 may or may not be implemented, per the desires of the user. It should be strongly noted such information is set forth for illustrative purposes and should not be construed as limiting in any manner. Any of the following features may be optionally incorporated with or without the exclusion of other features described.

Figure 3B:
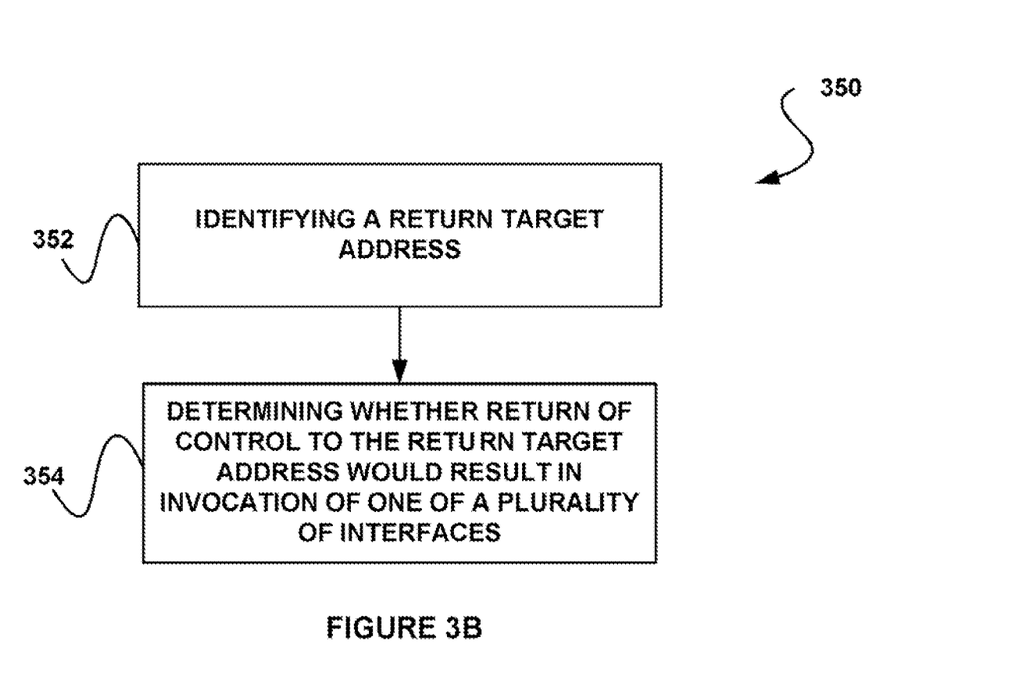
FIG. 3B shows a method for determining whether returning control to a return target address would result in an invocation of one of a plurality of interfaces, in accordance with another embodiment.

FIG. 3B shows a method 350 for determining whether returning control to a return target address would result in an invocation of one of a plurality of interfaces, in accordance with another embodiment. As an option, the method 350 may be implemented in the context of the architecture and environment of FIGS. 1 and/or 2, and may optionally be implemented in association with the method 300 of FIG. 3A. Of course, however, the method 350 may be carried out in any desired environment. It should also be noted that the aforementioned definitions may apply during the present description.

As shown in operation 354, a return target address is identified. In the context of the present description, the return target address may include any identifier that identifies a location in code, to which control is transferred upon execution of an associated return operation.

In one optional embodiment, the return target address may be associated with a call to an interface. For example, the call to the interface may specify the return target address. Thus, the return target address may identify a location in code to which control is to transfer once invocation of the interface and execution of any other code associated therewith is completed.

Additionally, it should be noted that the return target address may be identified in any desired manner. Just by way of example, in one possible embodiment, the return target address may be identified from a call stack. Such call stack may include a stack of calls where return target addresses are respectively pushed on the stack in association with each of such calls.

Further, it is determined whether return of control to the return target address would result in invocation of one of a plurality of interfaces, as shown in operation 354. For example, it may be determined whether return of control to code identified by the return target address would result in invocation of one of a plurality of interfaces.

The plurality of interfaces may include, for example, any predetermined set of interfaces. In one embodiment, the interfaces may include monitored interfaces (e.g. interfaces whose invocation is monitored, etc.). If it is determined that code which attempted to invoke the interface is attempting to, as a result of a return of control, invoke another interface, it can be concluded that there is at least a potential that the code (that attempted the invocation) may be obfuscating its identify (which is typically done for malicious purposes). Thus, an appropriate reaction may be initiated.

It should be noted that the foregoing determination may be carried out in any desired manner. During reference to FIG. 5, more illustrative information will be set forth regarding various optional features of a different embodiment with which the foregoing method 350 may or may not be implemented, per the desires of the user. It should be strongly noted such information is set forth for illustrative purposes and should not be construed as limiting in any manner. Any of the following features may be optionally incorporated with or without the exclusion of other features described.

Figure 4:
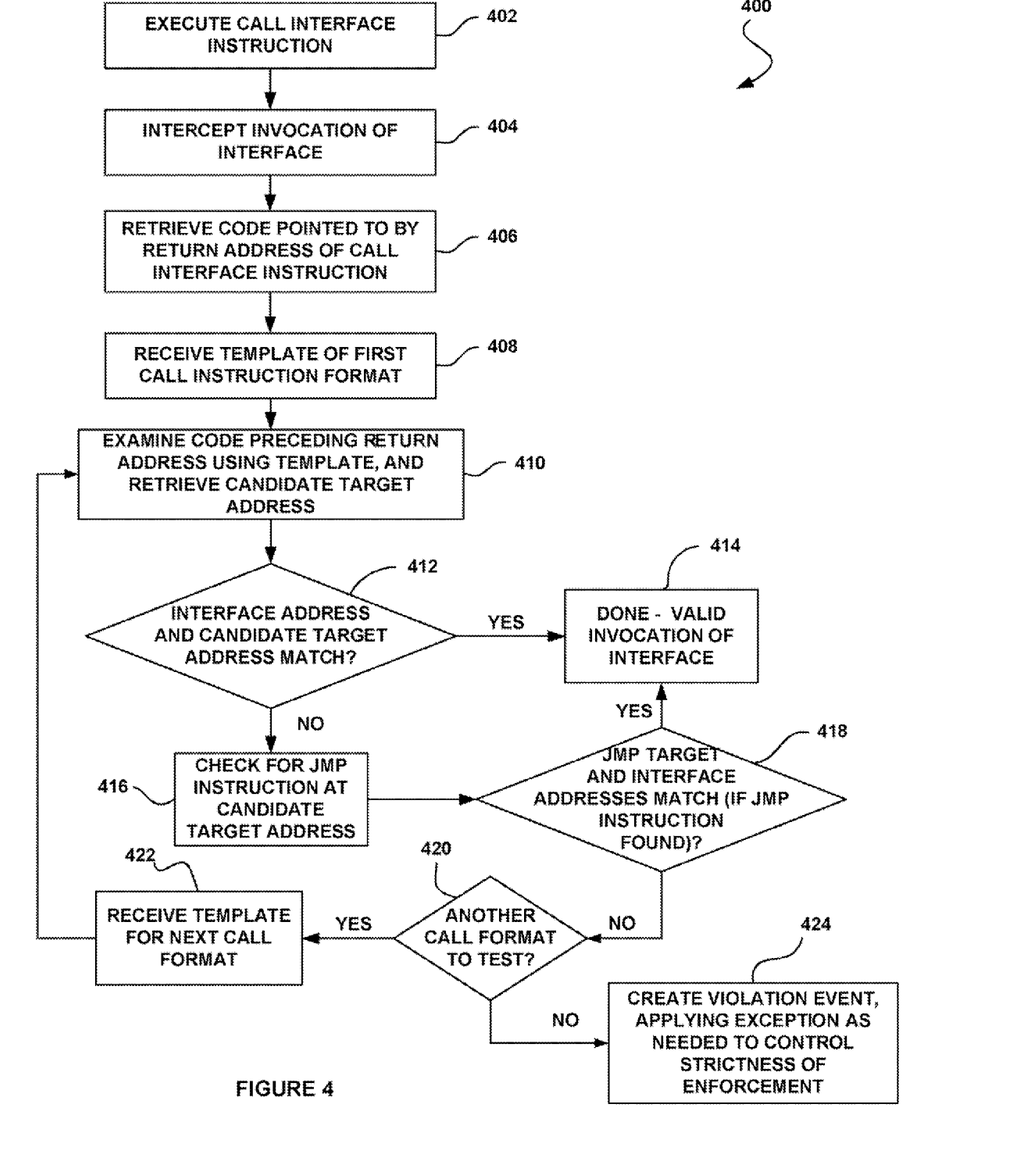
FIG. 4 shows a method for validating an invocation of an interface based on a plurality of call instruction formats, in accordance with another embodiment.

FIG. 4 shows a method 400 for validating an invocation of an interface based on a plurality of call instruction formats, in accordance with another embodiment. As an option, the method 400 may be implemented in the context of the architecture and environment of FIGS. 1-3B. Of course, however, the method 400 may be carried out in any desired environment. It should also be noted that the aforementioned definitions may apply during the present description.

As shown in operation 402, a call interface instruction is executed. The call interface instruction may include any call made to an interface. For example, the call interface instruction may include an instruction to invoke the interface. Moreover, the call interface instruction may be executed by a caller. Optionally, such caller may execute the call interface instruction utilizing any desired type of computer code (e.g. automatically via an application, via manual execution, etc.).

In addition, invocation of the interface is intercepted, as shown in operation 404. Thus, invocation of the interface by the execution of the call interface instruction may be intercepted. In one embodiment, invocation of the interface may be intercepted by an application utilized for monitoring the interface (e.g. a security application, etc.).

In another embodiment, the invocation of the interface may be intercepted by hooking the invocation of the interface. Of course, however, the invocation to the interface may be intercepted in any desired manner. In this way, execution of the invocation of the interface may be prevented, so that additional verification processing may be initiated.

Further, code pointed to by a return address of the call interface instruction is retrieved, as shown in operation 406. Optionally, the code may be retrieved by identifying the return address. For example, the return address may be identified from a call stack on which the return address was pushed in association with the call interface instruction that attempted the invocation of the interface.

The return address may then be utilized for locating and retrieving the code pointed to by the return address. Such code may include, for example, operations, instructions, etc. Thus, the code may include any code to which control is transferred once the call interface instruction and any code associated therewith is executed. Optionally, the code may also be stored.

Still yet, a template of a first call instruction format is received, as in operation 408. The first call instruction format may include one of a plurality of call instruction formats. In this way, the template may define one type of format of call instructions. In one embodiment, the first call instruction format may include a length of a call instruction. Of course, in other embodiments, the first call instruction format may be any format of a call instruction supported by a CPU of an associated computer (e.g. a computer via which the call interface instruction is executed, etc.).

Additionally, code preceding the return address of the call interface instruction is examined using the template, and a candidate target address is retrieved. Note operation 410. For example, such code may immediately precede code pointed to by the return address. In this way, a code context of the call interface instruction may be examined. In one exemplary embodiment, the template may be utilized to identify a length of code preceding the return address to be examined. Of course, however, the template may be utilized in any desired manner for examining the appropriate code. For example, in some embodiments, the template being tested may retrieve its candidate target address from memory, if in memory, such candidate target, address may be retrieved from a portion of memory referenced by the call instruction format being tested.

Furthermore, the candidate target address may be retrieved from the examined code. Such candidate target address may include any portion of the code that is potentially a target address associated with the call interface instruction. For example, such target address may identify an interface to be invoked by the associated call interface instruction.

In one embodiment, the candidate target address may be retrieved from the code based on a location in the code that is determined in accordance with the call instruction format of the template. Optionally, the template may be utilized for identifying where an instruction preceding the return address begins. Moreover, such instruction may be potentially inclusive of the target address. In this way, the candidate target address may be identified in the code based on the return address and the template.

Once the candidate target address is retrieved, it is determined whether an interface address and the candidate target address match, as shown in decision 412. The interface address may include any address associated with the interface for which the invocation was intercepted (see operation 404). Accordingly, it may be determined whether the target address of the call interface instruction is associated with such interface.

If it is determined that the interface address and the candidate target address match, it is determined that the invocation of the interface used the currently selected call instruction format, and was therefore valid. See operation 414. Optionally, the interface may then be allowed to continue (e.g. be invoked, etc.). In this way, a call interface instruction utilized for invoking an interface may be validated.

If, however, it is determined that the interface address and the candidate target address do not match, the candidate target address may be checked for a jump (JMP) instruction. Note operation 416. If it is determined that a JMP instruction exists, it is then determined whether the JMP target address associated with the JMP instruction and the interface address match, as shown in decision 418. Of course, if no JMP instruction exists, decision 418 may simply be skipped. The JMP target address may include any portion of code pointed to by the candidate target address. If it is determined that the JMP target address and the interface address match, it is determined that the invocation of the interface was valid, as shown in operation 414.

By this design, the present method 400 accommodates a situation where a lack of a match in decision 412 does not necessarily mean that the current call instruction template was not used. Further, while a JMP instruction is set forth in the current description, it should be noted that the candidate target address may be checked for any type instruction that transfers control, where such instruction does not affect the call stack associated with the call interface instruction executed by operation 402.

Similar to that described above with respect to the template of the first call instruction format, JMP instructions may also take a plurality of different formats. In this way, a template may be provided for each different JMP instruction format. Therefore, as an option, the candidate target address may be checked for a JMP instruction based on a template of a first JMP instruction format, and if no match is found between the JMP target address and the interface address, then a template of a next JMP instruction format may be utilized, and so forth. To this end, while not shown, operations 416 and 418 may be iterative in nature. In some embodiments, the template being tested may retrieve its JMP target address from memory. If in memory, such JMP target address may be retrieved from a portion of memory referenced by the JMP instruction format being tested.

Thus, situations may be accommodated where the target address is not presented directly in code associated with the call interface instruction. As an option, in one optional embodiment, contents of registers (e.g. CPU registers, etc.) available at the time of the attempt to invoke the interface by the execution of the call interface instruction may be preserved (e.g. stored, etc.) immediately upon interception of the invocation of the interface (see operation 404). In this way, the contents of the register may be available for identifying the JMP target address and therefore for determining whether the JMP target address and the interface address match (see decision 418). It should be noted that this technique may be used for the aforementioned call instruction format testing, as well.

In another exemplary embodiment, secondary JMP instructions may be utilized to invoke an interface with respect to import libraries. For example, Windows® LdrLoadDll may be monitored in ntdll.dll, but the LdrLoadDll export of Kernel32.dll may not be monitored. When the Kernel32.dll export is invoked, such export performs a JMP instruction to the ntdll export of LdrLoadDll. Thus, the return address may point to a call instruction that invokes the Kernel32 export, but not the ntdll export. Accordingly, the JMP target address may be identified and compared with the interface address to determine if there is a match (see decision 418).

With continuing reference to FIG. 4, if it is determined that the JMP target address and the interface address do not match, it is determined whether another call instruction format is available to test. Note operation 420. If another call instruction format is available, a template for a next call instruction format is received, as shown in operation 422. Code preceding the return address is then examined using the received template, and a candidate target address is retrieved (see operation 410). In this way, code preceding the return address of the call interface instruction may be examined based on each available call instruction format.

If all call instruction formats have been checked and none have resulted in a determination that the invocation of the interface is valid (see operation 414), a violation event is created and an exception is applied as needed to control strictness of enforcement, as shown in operation 424. In one embodiment, the violation event may include transmitting an alert to a user. Such alert may include an alert that malicious code is potentially executing on the computer on which the call interface instruction was executed.

In addition, the user may be provided with options for responding to the intercepted invocation of the interface. Such options may include allowing the interface to be invoked by the call interface instruction, logging information associated with the intercepted invocation of the interface, blocking usage of the interface (e.g. by a particular application, by all applications, etc.), terminating a process/thread utilized in attempting to invoke the interface, shutting down a computer on which the call interface instruction was executed, causing an exception to be performed, etc. Further, the user may also be allowed to create an exception, such that future attempts to invoke the interface by the call interface instruction are automatically determined to be valid and are therefore allowed. Of course, however, the violation event may also include automatically performing an action without input from a user, including, for example, any of those actions described above.

Thus, malicious code that is utilized to indirectly invoke an interface may be identified. For example, malicious code that invokes an interface via a JMP instruction (e.g. via a push of a return address, a push of a return address that points to a return instruction in a legitimate area of code, and a JMP instruction) may be identified in this way, an intrusion prevention system may be provided which prevents hackers from bypassing detection by hiding behind a return address that points to a legitimate area of code.

Figure 5:
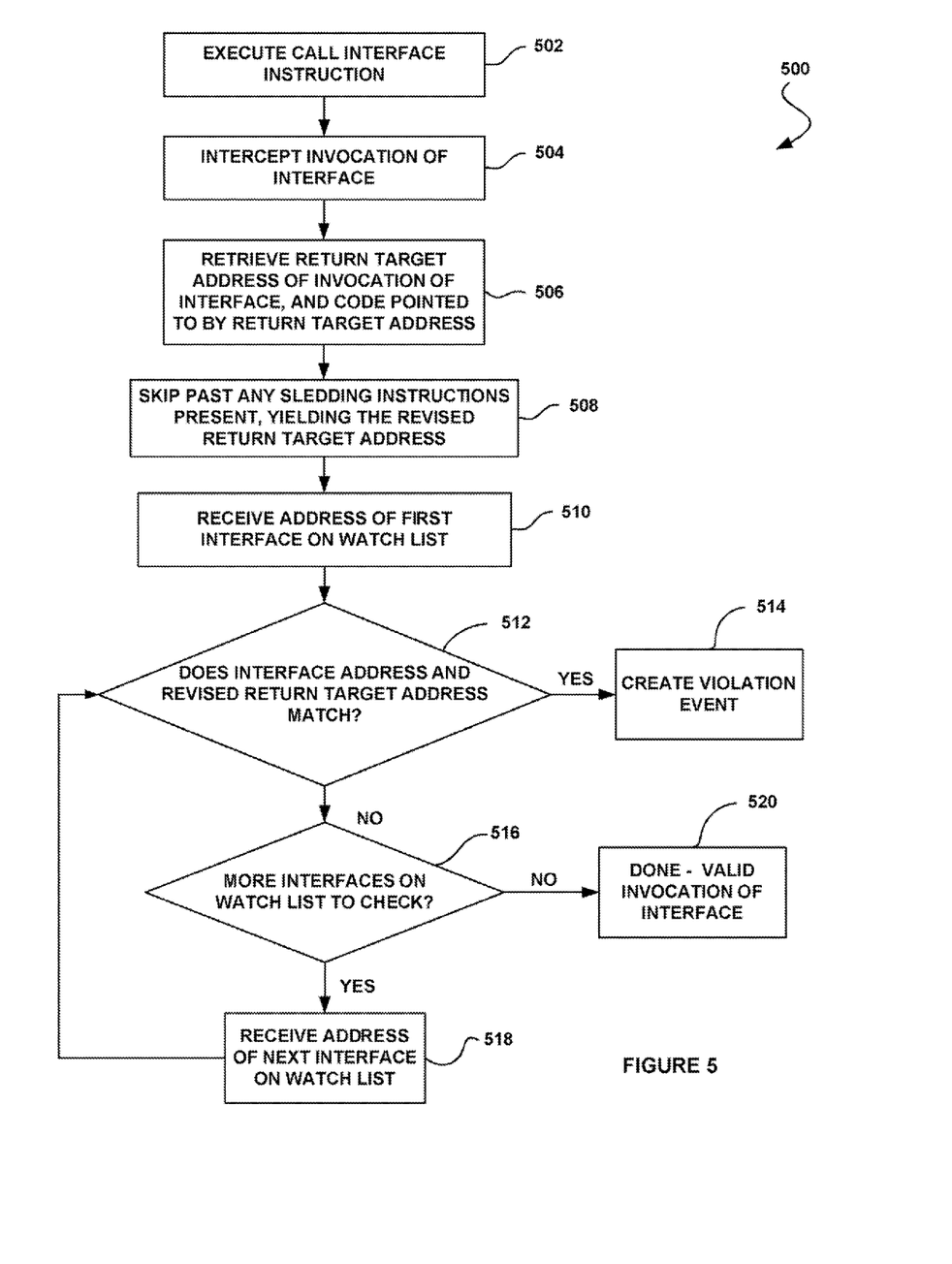
FIG. 5 shows a method for validating an invocation of an interface based on whether a return target address matches an address within a predetermined watch list of interfaces, in accordance with yet another embodiment.

FIG. 5 shows a method 500 for validating an invocation of an interface based on whether a return target address matches an address within a predetermined watch list of interfaces, in accordance with yet another embodiment. As an option, the method 500 may be implemented in the context of the architecture and environment of FIGS. 1-4. For example, the method 500 of FIG. 5 may be carried out independent from/in parallel with the method 400 of FIG. 4. Of course, however, the method 500 may be carried out in any desired environment. It should also be noted that the aforementioned definitions may apply during the present description.

As shown in operation 502, a call interface instruction is executed. In addition, invocation of an interface by the call interface instruction is intercepted, as shown in operation 504. Further, a return target address of the invocation of the interface along with code pointed to by the return target address are retrieved, as shown in operation 506. For example, such return target address may be retrieved from a call stack on which the return target address was pushed.

Any sledding instructions present in the code are skipped for yielding the revised return target address located in the code, as shown in operation 508. The sledding instructions may include any series of instructions that do not necessarily cause a change in operation, or whose change is considered to be of or little consequence. For example, the sledding instructions may include no operation (NOP) instructions that serve as placeholders, such that the execution of such NOP instructions does not necessarily effect a change. In this way, the revised return target address may be identified regardless of whether the return target address points to a start of an instruction sled.

Still yet, an address of a first interface on a watch list is received, as shown in operation 510. The watch list may include any list of interfaces for which invocations are monitored. For example, the watch list ma include a list of interfaces for which returns from call interface instructions are to be monitored.

As shown in decision 512, it is determined whether the interface address and the revised return target address match. Such a match may potentially indicate a situation where a caller is attempting to discuss itself as one of the monitored interfaces. Thus, if the interface address and the revised return target address match, a violation event is created, as shown in operation 514. Such violation event may optionally include the violation events described above with respect to operation 424 of FIG. 4, but of course may include any action capable of being taken in response to the intercepted invocation of the interface.

If however, it is determined that the interface address and the revised return target address do not match, the method 500 may continue. While not shown, it may be optionally determined whether the revised return target address is associated with a JMP instruction that points to a return target address that matches the interface address, as described above in FIG. 4 with respect to operation 416-418. Thus, the return target address may be identified if the attempt to invoke the interface was indirect.

With continuing reference to FIG. 5, if it is determined that the interface address and the revised return target address do not match, it may be determined whether there are more interfaces on the watch list to check, as shown in decision 516. If there are more interfaces on the watch list to check, an address of a next interface on the watch list is received (see operation 518), such that it may be determined whether the address of the next interface matches the revised return target address (see decision 512). Thus, it may be determined whether a return target address associated with a call interface instruction utilized for invoking an interface returns control to another interface on a watch list.

If it is determined that the revised return target address does not match any of the interface addresses associated with interfaces on the watch list, it is determined that the invocation of the interface is valid, as shown in operation 520. Thus, the invocation of the interface may be allowed to continue. In various embodiments, additional analysis may be performed on the attempted invocation of the interface, such as for example, the analysis described above with respect to FIG. 4, for preventing false positive violation events associated with legitimate code.

In this way, an identification of an actual source that executed the call interface instruction may be verified, and an invocation of the interface validated. Of course, the methods 400 and 500 of FIGS. 4 and 5 respectively may also be performed independently, for providing streamlined validation of invocations to interfaces. Moreover, in one optional embodiment, the methods 400 and 500 of FIGS. 4 and 5 respectively may be utilized by an intrusion prevention system (IPS) which monitors usage of interfaces. Such monitoring may be carried out for the purpose of detecting, for example, buffer overflow situations where a source thereof is hidden, etc.

While various embodiments have been described above, it should be understood that they have been presented by way of example only, and not limitation. Thus, the breadth and scope of a embodiment should not be limited by any of the above-described exemplary embodiments, but should be defined only in accordance with the following claims and their equivalents.

What is claimed is:

1. A method, comprising:
selecting one of a plurality of call instruction formats; and
verifying whether an invocation of an interface was attempted by code utilizing the selected call instruction format, utilizing a processor;
wherein the selecting and verifying are repeated for each of the plurality of call instruction formats.

2. The method of claim 1, and further comprising intercepting the invocation of the interface.

3. The method of claim 1, and further comprising storing the code that attempted the invocation of the interface.

4. The method of claim 1, wherein the code is identified utilizing a return address associated with the attempted invocation.

5. The method of claim 4, wherein a target address associated with the code is identified based on the return address and the selected call instruction format.

6. The method of claim 5, wherein the verifying further includes determining whether the target address matches an address associated with the interface.

7. The method of claim 6, wherein the attempted invocation of the interface is conditionally allowed to continue based on the determination.

8. The method of claim 5, wherein a jump instruction associated with the target address is identified.

9. The method of claim 8, wherein the verifying further includes determining whether a jump target address associated with the jump instruction matches an address associated with the interface.

10. The method of claim 1, wherein each of the plurality of the call instruction formats includes a template.

11. The method of claim 10, wherein each template defines a length of a call instruction.

12. A computer program product embodied on a non-transitory computer readable medium, comprising:
computer code for selecting one of a plurality of call instruction formats; and
computer code for verifying whether an invocation of an interface was attempted by code utilizing the selected call instruction format;
wherein the computer program product is operable such that the selecting and verifying are repeated for each of the plurality of call instruction formats.

13. A system, comprising:
a processor for selecting one of a plurality of call instruction formats, the processor further adapted for verifying whether an invocation of an interface was attempted by code utilizing the selected call instruction format;
wherein the system is operable such that the selecting and verifying are repeated for each of the plurality of call instruction formats.

14. The system of claim 13, further comprising a display and memory coupled to the processor via a bus.

15. A method, comprising:
identifying a return target address; and
determining whether return of control to the return target address would result in invocation of one of a plurality of interfaces, utilizing a processor.

16. The method of claim 15, and further comprising skipping a plurality of instructions pointed to by the return target address.

17. The method of claim 16, wherein the plurality of instructions include no operation instructions.

18. The method of claim 15, and further comprising identifying an additional return target address.

19. The method of claim 18, wherein the determining further includes determining whether the additional return target address matches an address associated with one of the plurality of interfaces.

20. The method of claim 15, wherein invocation of an interface by code associated with the return target address is intercepted.

21. The method of claim 15, wherein invocation of an interface by code associated with the return target address is conditionally allowed to continue based on the determination.

22. The method of claim 15, wherein the plurality of interfaces are stored in a watch list.

23. The method of claim 15, wherein a violation event is conditionally performed based on the determination.

24. The method of claim 15, wherein a jump instruction associated with the additional return target address is identified.

25. The method of claim 24, wherein the determining further includes determining whether a jump target address associated with the jump instruction matches an address associated with one of the plurality of interfaces.

* * * * *